US012307001B2

(12) United States Patent
Zeschg et al.

(10) Patent No.: US 12,307,001 B2
(45) Date of Patent: May 20, 2025

(54) METHOD AND CONFIGURABLE HARDWARE MODULE FOR MONITORING A HARDWARE-APPLICATION

(71) Applicant: Siemens Aktiengesellschaft, Munich (DE)

(72) Inventors: Thomas Zeschg, Munich (DE); Hans Aschauer, Munich (DE); Rainer Falk, Poing (DE); Christian Peter Feist, Munich (DE); Aliza Maftun, Munich (DE); Hermann Seuschek, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 696 days.

(21) Appl. No.: 17/434,872

(22) PCT Filed: Feb. 26, 2020

(86) PCT No.: PCT/EP2020/054969
§ 371 (c)(1),
(2) Date: Aug. 30, 2021

(87) PCT Pub. No.: WO2020/178089
PCT Pub. Date: Sep. 10, 2020

(65) Prior Publication Data
US 2022/0164485 A1 May 26, 2022

(30) Foreign Application Priority Data
Mar. 1, 2019 (EP) ..................... 19160232
Sep. 16, 2019 (EP) ..................... 19197579

(51) Int. Cl.
*G06F 21/76* (2013.01)
*G06F 21/53* (2013.01)
*G06F 21/60* (2013.01)

(52) U.S. Cl.
CPC .............. *G06F 21/76* (2013.01); *G06F 21/53* (2013.01); *G06F 21/604* (2013.01); *G06F 21/606* (2013.01); *G06F 2221/2141* (2013.01)

(58) Field of Classification Search
CPC ........ G06F 21/76; G06F 21/53; G06F 21/604; G06F 21/606
See application file for complete search history.

(56) References Cited

U.S. PATENT DOCUMENTS 10,860,357 B1 * 12/2020 Johnson .............. G06F 13/4282
2004/0049672 A1 3/2004 Bartic
(Continued)

FOREIGN PATENT DOCUMENTS

CN 101484877 A 7/2009
CN 105683939 A 6/2016
(Continued)

OTHER PUBLICATIONS

Maftun Aliza et al.; "Monitoring, Validation and Sanitization of Hardware-App Interfaces"; Siemens AG; pp. 1-6; Prior Art Publishing GmbH; Prior Art Publishing GmbH; Manfred-Von-Richthofen-Str.9, 12101 Berlin Germany; www.priorartregister.com; XP007022573; 2019.
(Continued)

*Primary Examiner* — Shanto Abedin
(74) *Attorney, Agent, or Firm* — Schmeiser, Olsen & Watts LLP (57) ABSTRACT

Incoming and outgoing communication of a hardware-application component is monitored and controlled at runtime of the hardware-application component. In this way, a kind
(Continued)

of firewall is provided for ensuring secure and un-altered operation of a hardware-application performing security-critical functionalities on a field-programmable gate array. The hardware-application component may interact with other components directly and/or via an on-chip bus. The monitoring of incoming and/or outgoing communication is particularly advantageous when using third party hardware-applications or software applications, i.e., applications developed by untrusted parties. Another advantage is the possibility of monitoring and controlling all the communication between hardware-applications, hardware- and software applications, hardware-applications and peripherals, IO controllers, etc. It is beneficial especially in case a hardware-application is compromised and tries to compromise the rest of the embedded device, or in case a corrupted software application tries to compromise the associated hardware-application at runtime.

17 Claims, 2 Drawing Sheets

(56) References Cited

U.S. PATENT DOCUMENTS

| | | | |
|---|---|---|---|
| 2007/0174910 A1* | 7/2007 | Zachman | G06F 21/79 726/18 |
| 2008/0028187 A1 | 1/2008 | Casselman et al. | |
| 2009/0235063 A1 | 9/2009 | Skoric et al. | |
| 2015/0082407 A1* | 3/2015 | Galpin | H04L 67/60 726/9 |
| 2015/0188707 A1* | 7/2015 | Gehrer | H04L 9/3006 380/30 |
| 2015/0230108 A1* | 8/2015 | Sridhara | G06F 21/552 455/26.1 |
| 2016/0018465 A1* | 1/2016 | Bockelkamp | G06F 11/3652 714/726 |
| 2016/0180078 A1* | 6/2016 | Chhabra | G06F 21/57 726/19 |
| 2016/0202999 A1 | 7/2016 | Van Den Heuvel et al. | |
| 2017/0054696 A1* | 2/2017 | Roth | H04L 63/083 |
| 2017/0244704 A1* | 8/2017 | Brickell | H04L 63/123 |
| 2018/0089132 A1* | 3/2018 | Atta | G06F 13/4282 |
| 2018/0288097 A1* | 10/2018 | Poornachandran | G06F 21/55 |
| 2018/0314846 A1* | 11/2018 | Schultz | G06F 9/45558 |
| 2019/0258597 A1* | 8/2019 | Atta | G06F 13/4068 |

FOREIGN PATENT DOCUMENTS

| | | |
|---|---|---|
| CN | 108694316 A | 10/2018 |
| EP | 2853965 A1 | 4/2015 |

OTHER PUBLICATIONS

Lemay Michael et al.; "Network-on-Chip 1-20 Firewall: Countering Defective and Malicious System-an-Chip Hardware"; International Conference on Financial Cryptography and Data Security; Springer; pp. 404-426; XP047366467; 2015.

PCT International Search Report and Written Opinion of International Searching Authority mailed Apr. 9, 2020 corresponding to PCT International Application No. PCT/EP2020/054969 filed Feb. 26, 2020.

Extended European Search Report dated Apr. 2, 2020 for Application No. 191975796.

Zhang Nan; "Design and Implementation of Configurable Remote Temperature Monitoring System SoPC"; Computer Applications and Software; Jun. 15, 2012; vol. 29; No. 6.

* cited by examiner

FIG 3

METHOD AND CONFIGURABLE HARDWARE MODULE FOR MONITORING A HARDWARE-APPLICATION

CROSS-REFERENCE TO RELATED APPLICATIONS

This application claims priority to PCT Application No. PCT/EP2020/054969, having a filing date of Feb. 26, 2020, which is based on EP Application No. 19197579.6, having a filing date of Sep. 16, 2019, and EP Application No. 19160232.5, having a filing date of Mar. 1, 2019, the entire contents all of which are hereby incorporated by reference.

BACKGROUND

Embedded devices, such as electronic control units (ECU), industrial personal computers (PC), or internet of things (IoT) devices, are employed for various tasks in industrial processes. The correct and unmanipulated functioning of the devices is vital as they are also used for monitoring and/or controlling critical processes (e.g. availability, reliability, real-time, and safety). Additionally, the growing trends for industry 4.0 scenarios have led to an increase in the networking of industrial devices for various purposes, such as monitoring, remote control, and analysis. The industrial devices become more prone to attacks with the increase in networked devices.

Since the industrial embedded devices serve for a long usage period (usually 10 to 20 years, sometimes 30 to 40 years) in field (industrial environment), they experience dynamically changing environments. This may lead to the requirement of developing flexible embedded devices that can cope up with the ever-changing environments. This can be achieved by employing an approach similar to smart phone applications that can be downloaded/installed/upgraded on runtime. In the future, a similar approach will be supported by the industrial devices.

Besides software applications also hardware-application components can be realized by using reconfigurable hardware. A hardware-application component makes use of partial reconfiguration features of, for instance, field programmable gate arrays (FPGAs), FPGA system-on-a-chip (SoC), application-specific integrated circuit (ASIC) SoC with embedded FPGA, and application-specific standard products (ASSP), SoCs with embedded FPGA. A hardware-application can be an independent stand-alone application, such as a hardware-application component, or it can be part of a software-hardware-application bundle.

FPGAs that leverage partial reconfiguration to reconfigure parts of the hardware on-the-go are available in the market, such as Intel Cyclone V, Intel Arria 10. On a partially reconfigurable FPGA, a hardware-application can be instantiated within a partial reconfiguration region of a reconfigurable hardware as a hardware-application component.

SUMMARY

An aspect relates to the security of configurable hardware modules that execute hardware-applications.

According to the method for monitoring a hardware-application, the following steps are executed:
  receiving, by a configurable hardware module, in particular a field-programmable gate array, a hardware-application, wherein the received hardware-application comprises configuration data describing an instantiation as a hardware-application component on the configurable hardware module,
  instantiating, by a trustworthy hardware component, in particular an on-chip logic located within the configurable hardware module, the received hardware-application as the hardware-application component in an execution environment, in particular a partial reconfiguration region, of the configurable hardware module, and
  monitoring incoming and/or outgoing communication of the hardware-application component at runtime of the hardware-application component.

The configurable hardware module for monitoring a hardware-application comprises
  at least one execution environment, configurable for execution of a hardware-application component,
  a trustworthy hardware component, configured for instantiation of a hardware-application as the hardware-application component within the execution environment, and
  a first unit and/or a second unit, configured for monitoring incoming and/or outgoing communication of the hardware-application component at runtime of the hardware-application component.

The following advantages and explanations are not necessarily the result of the object of the independent claims. Rather, they may be advantages and explanations that only apply to certain embodiments or variants.

Within each partial reconfiguration region of the reconfigurable hardware, only a single hardware-application can be instantiated at the same time. However, a hardware/software application bundle can contain several hardware-applications that can each be instantiated as hardware-application components within the same partial reconfiguration region of the reconfigurable hardware at different points in time. Furthermore, other hardware-applications may be instantiated as hardware-application components within other partial reconfiguration regions of the reconfigurable hardware. The monitoring of incoming and/or outgoing communication of the hardware-application component can be performed for a single hardware-application component only, for several hardware-application components, or for all hardware-application components.

The hardware-application component may interact with other components directly and/or via an on-chip bus. Incoming and/or outgoing communication means any kind of interaction along communication paths to and from the hardware-application component, for example access operations, input, and output. The monitoring can be achieved by a kind of "firewalling" mechanism, which will be described in more detail below.

In connection with embodiments of the invention, "hardware-application" can be understood to mean, for instance, a component that is written in Very High Speed Integrated Circuit Hardware Description Language (VHDL) or in Verilog HDL and instantiated on a configurable hardware module, for instance, a FPGA. The configuration data of the hardware-application describe the layout of the hardware-application component that can be instantiated in hardware on the configurable hardware module. Therefore, the hardware-application describes a configuration of, for instance, a digital circuit that can be uploaded in the execution environment of the configurable hardware module. A hardware-application component is an instantiated and executed hardware-application. The configurable hardware module may comprise a plurality of reconfigurable parts that are described by a configuration specification. The configuration specification comprises for instance a floor plan that describes which parts of the configurable hardware module are reconfigurable at runtime. This has the advantage that at runtime hardware-applications comprising, for instance, different and/or other hardware functionality can be uploaded on the configurable hardware module.

Ensuring secure (i.e. non-malicious) and un-altered operation of the hardware-application is vital, especially if the hardware-application instantiated as a hardware-application component on the configurable hardware module performs security-critical functionalities, such as encryption/decryption, key management, key agreement, or contributes to safety-critical operations, for example through the control of device IOs.

The monitoring of incoming and/or outgoing communication is particularly advantageous when using third party hardware-applications or software applications, i.e., applications developed by untrusted parties.

The hardware-application can be received from a trustworthy software component, in particular a reconfiguration and update manager.

In a preferred embodiment, all communication of all hardware-application components can be monitored as well as controlled.

The advantage of that embodiment is the possibility of monitoring and controlling all the communication between hardware-applications, hardware- and software applications, hardware-applications and peripherals, IO controllers, etc. The embodiment introduces the ability of monitoring and filtering all inputs and outputs of the hardware-applications. It is beneficial especially in case a hardware-application is compromised and tries to compromise the rest of the device, or in case a corrupted software application tries to compromise the associated hardware-application at runtime.

In an embodiment of the method, the monitored communication is incoming from and/or outgoing to
- a kernel of an operating system being executed by a processor,
- a software application being executed by the processor,
- another hardware-application component,
- a general-purpose input/output,
- a computer port,
- a peripheral device, and/or
- a on-chip logic.

The monitored communication can be incoming from and/or outgoing to any number and combination of these examples, for example 1 kernel, 17 hardware-application components, 64 general-purpose inputs/outputs, 8 computer ports, 7 peripheral devices, and 1 on-chip logic. The on-chip logic could be any logic/IP core within the configurable hardware module, for example an encryption core.

An embodiment of the method comprises the additional step of controlling at least some of the incoming and/or outgoing communication of the hardware-application component at runtime of the hardware-application component, in particular by blocking and/or modifying at least some of the incoming and/or outgoing communication of the hardware-application component.

This embodiment provides a solution for monitoring, controlling and filtering the inputs and outputs to each hardware-application. Further, in case of applications developed by a third-party, it can ensure that possible backdoors cannot be effectively used. It provides a mechanism to confine the hardware-applications so that they cannot access other components and data on the device, especially the security-critical parts of the device.

By restricting communication paths to and from the untrusted application, only allowed data can be exchanged with an allowed set of interfaces. Therefore, sandboxing hardware-applications is supported so that a compromised or non-trusted hardware-application is restricted from accessing the rest of the device. Additionally, controlling incoming and/or outgoing communication can help to ensure that the deployed hardware-application can never gain enough privileges to compromise the operations of the rest of the device, i.e., software-applications, operating system, other hardware-applications, etc.

This embodiment may also facilitate the certification of security-critical (and maybe even safety-critical) applications, since it allows a certain degree of separation of concerns. This opens the possibility of a composite certification process, where only the modified parts of a product need to be evaluated.

In another embodiment of the method, the monitoring step includes detecting an unauthorized access to and/or from the hardware-application component, and the controlling step includes
- blocking the unauthorized access,
- disabling access to at least one functionality of the hardware-application component and/or the configurable hardware module,
- blocking all communication of the hardware-application component,
- logging the unauthorized access,
- replacing the hardware-application component with a secure hardware-application component, and/or
- terminating the hardware-application component.

While the first three measures might be performed by the first unit and/or a second unit as described below, the other steps could be performed by different entities. For example, the logging could be performed by a kernel module. The replacement of the hardware-application component could be performed by instantiating a known-secure hardware-application component in the execution environment. The termination might be performed by disabling a clock signal for the hardware-application component. A single or any combination of the six measures of the embodiment may be implemented.

In a further embodiment of the method, the monitoring step and the controlling step are performed by a first unit and/or a second unit.

For example, both units are each capable of monitoring and controlling communication but handling different kinds of communication.

In another embodiment of the method, the first unit is a kernel module that monitors and controls communication incoming from and/or outgoing to
- a kernel of an operating system being executed by a processor, and/or
- a software application being executed by the processor.

The kernel module is customized and contains code to extend the running kernel, or so-called base kernel, of the operating system.

In another embodiment of the method, the second unit monitors and controls communication incoming from and/or outgoing to
- at least one other hardware-application component,
- at least one general-purpose input/output,
- at least one computer port,
- at least one peripheral device, and/or
- at least one on-chip logic.

In another embodiment of the method, the second unit is instantiated in the instantiating step as a wrapper around the hardware-application within the execution environment,
a switching module, in particular an IP core, that gates all inputs and outputs of the hardware-application component, or
a controller.

The wrapper is a logic that controls all the inputs and outputs of the instantiated hardware-application.

The controller can be realized as a customized interface controller. The incoming and/or outgoing communication of the hardware-application component passes through the controller. For example, the controller can be an extension of a peripheral bus controller, or directly integrated into a peripheral bus controller.

In another embodiment of the method, the first unit and/or the second unit implement a fixed policy and/or a reconfigurable policy for the controlling of the incoming and/or outgoing communication of the hardware-application component.

The fixed policy and/or the reconfigurable policy consist for example of rules. The fixed policy can also be implicitly included in a static logic of the second unit.

The policies provide a mixture of static and loadable rules that can be individualized for each hardware-application.

As each hardware-application might communicate to a different set of on-chip peripherals, controllers, or other hardware-applications, these policies can be individualized for each hardware-application in order to apply sufficient security measures for confinement in all implementation scenarios. Consequently, the embedded device in field is protected not only from hardware attacks such as hardware Trojans, compromised hardware-applications, side-channel attacks, fault injection, IC depackaging and delayering, but also from software attacks.

With the help of these individualized policies, a secure execution environment for each hardware-application is provided even though each hardware-application might require access to a different set of input/output (IO) interfaces and corresponding controllers.

In another embodiment of the method, the reconfigurable policy of the first unit and/or the second unit is updated at runtime of the configurable hardware module.

For example, if the second unit is instantiated in the instantiating step as a wrapper around the hardware-application within the execution environment, then in order to update the reconfigurable policy, the wrapper and the hardware-application can be reinstantiated within the execution environment.

An embodiment of the configurable hardware module comprises a field programmable gate array, an application specific integrated circuit, or an application specific standard product.

In another embodiment of the configurable hardware module,
the configurable hardware module is a field-programmable gate array or contains a field-programmable gate array,
the execution environment is a partial reconfiguration region, and/or
the trustworthy hardware component is an on-chip logic, in particular a PR logic.

Due to the possibility to reconfigure partial reconfiguration regions of a field-programmable gate array, it is possible to use hardware in a more flexible way and to adapt the hardware according to changing demands and requirement. Especially it is possible to reconfigure the configurable hardware module at runtime.

Another embodiment of the configurable hardware module comprises a hardware bus that is used by the hardware-application component for the incoming and/or outgoing communication. The first unit and/or the second unit are configured for monitoring communication that is incoming from and/or outgoing to at least one device or component connected to the hardware bus.

In another embodiment of the configurable hardware module, the hardware bus is chosen from a group of hardware-buses comprising at least an advanced microcontroller bus architecture, an advanced high-performance bus, an advanced extensible bus, a wishbone bus and/or a peripheral component interconnect express bus.

In another embodiment of the configurable hardware module, the second unit is
a wrapper around the hardware-application within the execution environment,
a switching module, in particular an IP core, that gates all inputs and outputs of the hardware-application component, or
a controller.

In another embodiment, the configurable hardware module is configured for executing the method.

The embedded device contains the configurable hardware module.

The computer-readable storage media contains a hardware/software application package, comprising configuration information required for automated performing of the method. The configuration information includes at least one hardware-application that can be instantiated as a hardware-application component and executed by an execution environment. The configuration information also includes a fixed policy and/or a reconfigurable policy for automated monitoring and/or controlling of incoming and/or outgoing communication of the hardware-application component.

In an embodiment of the computer-readable storage media, the hardware/software application package also contains a software application and a signature. The software application contains instructions executable by a processor.

BRIEF DESCRIPTION

Some of the embodiments will be described in detail, with references to the following Figures, wherein like designations denote like members, wherein.

DETAILED DESCRIPTION

In the following description, various aspects of embodiments of the present invention and embodiments thereof will be described. However, it will be understood by those skilled in the art that embodiments may be practiced with only some or all aspects thereof. For purposes of explanation, specific numbers and configurations are set forth in order to provide a thorough understanding. However, it will also be apparent to those skilled in the art that the embodiments may be practiced without these specific details.

Figure 1:
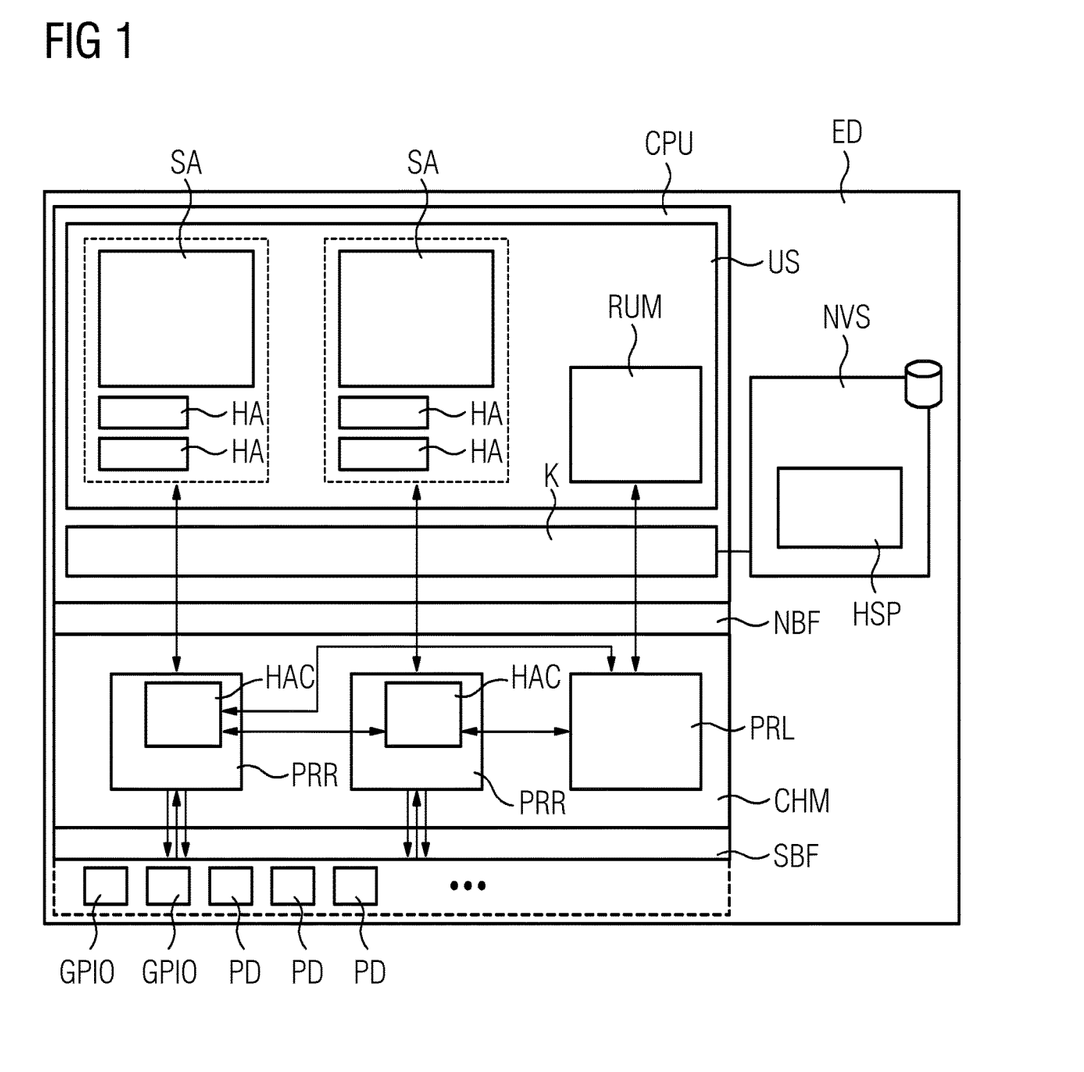
FIG. 1 shows a schematic diagram of a specific example for illustrating a monitoring of a hardware-application with a configurable hardware module.

FIG. 1 shows schematically a specific example illustrating the monitoring of a hardware-application with a configurable hardware module according to embodiments of the present invention. In the illustrated exemplary embodiment an embedded device ED, e.g. a device of the industry, may comprise a configurable hardware module CHM, such as an FPGA, and a processor CPU. The configurable hardware module CHM and processor CPU are provided as separate components. In an alternative embodiment, the processor CPU and configurable hardware module CHM can be implemented by a system on a chip design, wherein the components are realized on a single chip. In a further alternative embodiment, the processor CPU is provided by a reconfigurable ASIC. Therefore, a software application can deploy hardware-applications to hardware to either use the hardware in a more flexible manner or simply re-use the resources available in a more efficient way.

Due to the changing industrial environments, the use of configurable hardware modules CHM in embedded devices ED is gaining rise. In the context of partially reconfigurable FPGAs, hardware-applications HA are instantiated within execution environments PRR, for example partially reconfigurable regions of the FPGA.

A trustworthy software component, i.e., a reconfiguration and update manger RUM assigns an execution environment PRR to each hardware-application HA and manages corresponding user- and kernel space settings. A kernel K of an operating system is executed by a processor CPU and forms the interface between hardware-application components HAC and a user space US with software applications SA and comprises the drivers for the operating system.

On the configurable hardware module CHM side, a corresponding on-chip logic PRL implements the partial reconfiguration logic (PR-logic). The on-chip logic PRL takes over the reconfiguration process and locks each execution environment PRR to its assigned hardware-application HA. The kernel K in conjunction with the on-chip logic PRL ensures that each execution environment PRR can be configured by the assigned software application SA only. Additionally, the kernel K and/or the on-chip logic PRL ensures that during the reconfiguration of the execution environment PRR with the appropriate hardware-application HA, for instance, distinct as a partial bitstream, corresponding interface-settings for monitoring incoming and/or outgoing communication of the hardware-application component at runtime of the hardware-application component are put into place. These interface-settings can be a kind of firewall configuration, for example with policies, and will be described in more detail below.

A non-volatile storage NVS stores all information that are necessary to re-boot the embedded device ED. The information comprises the operation system, and hardware/software application packages HSP that include the interface-settings/firewall configuration in the form of policies.

In connection with embodiments of the invention, each hardware/software application package HSP comprises one or e more hardware-applications HA. Each hardware-application HA might be, for instance, a partial bitstream that can be uploaded in the execution environment PRR, which is for instance a partial reconfigurable region. The partial bitstream can be used to configure the execution environment PRR and to instantiate a hardware-application component HAC in the execution environment PRR so that the software application SA can use the execution environment PRR for further processing. The partial bitstream specifies how the execution environment PRR as well as the instantiated hardware-application component HAC will be configured.

Figure 2:
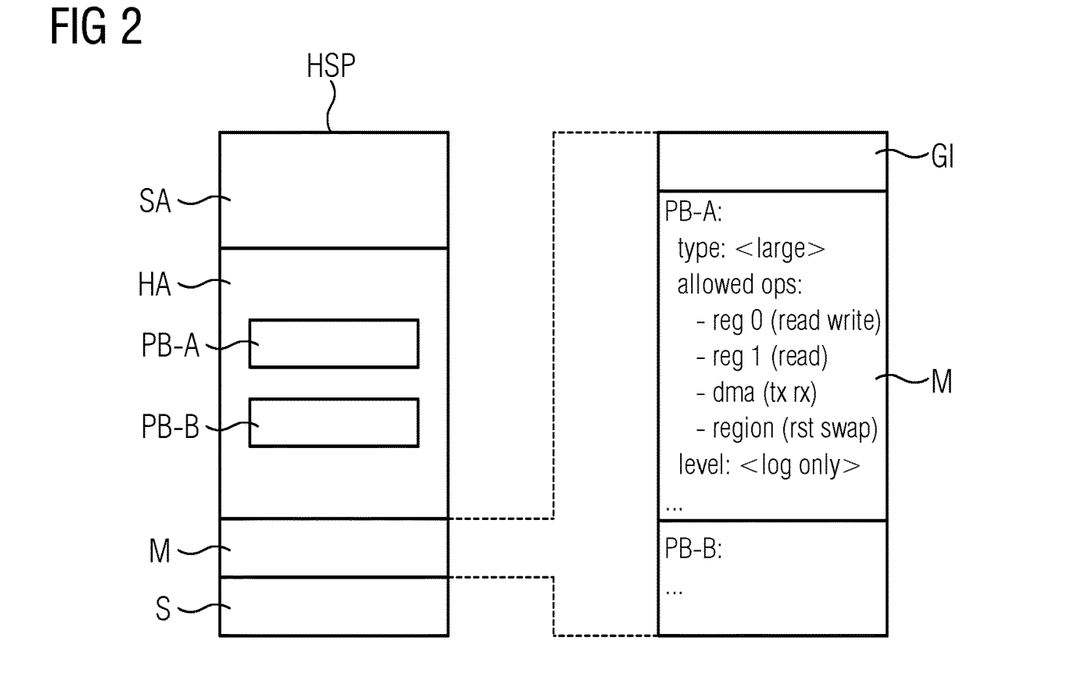
FIG. 2 shows a hardware/software application package.

In FIG. 1 two hardware-application components HAC that are instantiated in two execution environments PRR are exemplary shown. The number of hardware-application components HAC as well as of execution environments PRR on the configurable hardware module CHM is not limited to the number as shown in FIG. 1. It is rather conceivable that further execution environments PRR and hardware-application components HAC can be generated and instantiated. It is also possible to exchange the hardware-application HA that is currently instantiated within the execution environment PRR with another hardware-application HA. A hardware application HA can be bundled with a software application SA as shown in FIG. 2, or it can work stand-alone.

In order to monitor, or even control, incoming and/or outgoing communication of the hardware-application component at runtime of the hardware-application component, a kind of firewalling mechanism is used. Firewalls are known from computer networks. Using policies in the form of rule sets, they allow or block incoming and/or outgoing network communication of a network device. With regard to the described embodiment, the term "firewall" is used as an analogy.

The monitored communication can be incoming from and/or outgoing to the kernel K, the corresponding software application SA, which is executed by the processor CPU, another hardware-application component HAC, a general-purpose input/output GPIO, a computer port, a peripheral device PD, and/or the on-chip logic PRL.

At least some of the incoming and/or outgoing communication of the hardware-application component HAC can be blocked and/or modified at runtime of the hardware-application component HAC.

The monitored incoming and/or outgoing communication of the hardware-application component HAC may include access operations such as bus access or access to the peripheral devices PD, that originate from the hardware-application component HAC.

When the monitoring detects an unauthorized access, the unauthorized access can be blocked and/or logged (logging may include providing an information to the reconfiguration and update manager RUM, so that the latter can decide on the action to take), an alarm can be generated, or the operation of the hardware-application component HAC can be terminated, for example, by deactivating its clock signal. In addition, or as an alternative, access to certain functionalities of the hardware-application component HAC and/or the configurable hardware module CHM can be disabled, or sensitive data of the hardware-application component HAC can be erased.

However, blocking unauthorized access does not necessarily require previous detection, as, for example, certain bus signals for an interface of a hardware-application component HAC can simply be gated.

In order to implement this kind of monitoring and control of the interactions of the hardware-application components HAC within the embedded device ED, a first unit NBF and a second unit SBF are used. The first unit NBF can be understood as a "northbound firewall", using the analogy from above.

The first unit NBF is a customized (loadable) kernel module that monitors and controls communication incoming from and/or outgoing to the kernel K, and/or communication incoming from and/or outgoing to a software application SA being executed by the processor CPU. In other words, the first unit NBF monitors the communication path between the hardware-application component HAC and its corresponding software application SA. For example, the first unit NBF may block access from any other, unauthorized software application SA.

The second unit SBF can be understood as a "southbound firewall", using the analogy from above. It monitors and controls communication incoming from and/or outgoing to other hardware-application components HAC, general-purpose inputs/outputs GPIO, computer ports, peripheral devices PD, IO-Controllers, and/or the on-chip logic PRL. The hardware-application component HAC might access these directly or via an on-chip bus. The on-chip bus can be a hardware bus that is chosen from a group of hardware-buses, including an advanced microcontroller bus architecture, an advanced high-performance bus, an advanced extensible bus, a wishbone bus or a peripheral component interconnect express bus.

The first unit NBF and second unit SBF implement a fixed policy as well as a reconfigurable policy for the controlling of the incoming and outgoing communication of the hardware-application component HAC. The fixed policy is a basic set of rules that are always in place. It can be developed by a device developer. The reconfigurable policy is an updateable set of rules that can be swapped (or updated) along with the hardware-application. In this way, access to security-critical interfaces can be restricted as needed.

As an alternative embodiment, only a fixed policy may be used. The fixed policy may be hardcoded in the configurable hardware module CHM.

The second unit SBF might, for example, be configured by the kernel K, in particular by the first unit NBF.

FIG. 2 shows a hardware/software application package HSP that can be transferred to the embedded device ED shown in FIG. 1. It consists of a software application SA, one or more hardware-applications HA in the form of a first partial bitstream PB-A and a second partial bitstream PB-B, a manifest M, and a signature S. The manifest M includes meta-information about the hardware/software application package HSP. It comprises a general info GI and the reconfigurable policy as described in the previous paragraph. In other words, the manifest M contains a configuration of a "firewall" for the execution environment PRR in which the hardware-application HA will be instantiated.

The hardware/software application package HSP can be stored on a computer-readable storage medium, for example a USB flash drive.

Returning to FIG. 1, the implementation of the second unit SBF may take a number of forms. It could, for example, be instantiated as a wrapper around the hardware-application HA within the execution environment PRR, either as part of the hardware-application component HAC or next to it. It then monitors and/or filters all the inputs and outputs of the hardware-application HA. Additionally, it enforces the base policy as well as the reconfigurable policy that define the allowed set of interactions between the hardware-application HA and the rest of the embedded device ED.

Another variant of the second unit is a switching module, in particular an IP core, that filters and/or gates all inputs and outputs of the hardware-application component HAC. The switching module enforces the base policy as well as the reconfigurable policy by enabling only allowed interfaces. The base policy and/or the reconfigurable policy can be uploaded into the switching module either during the system boot-up/initial configuration or when the hardware-application HA is loaded to the reconfigurable execution environment PRR. For example, the base policy can be uploaded into the switching module during initial configuration, and the reconfigurable policy can be uploaded into the switching module when the hardware-application HA is loaded to the execution environment PRR.

Another possibility for implementing the second unit SBF is an interface controller, or customized controller. In this scenario, all incoming and outgoing communication of the hardware-application component HAC passes the interface controller, which is capable of enforcing the base policy as well as the reconfigurable policy. Furthermore, the functionality of the second unit SBF may be integrated into a peripheral bus controller that uses the base policy as well as the reconfigurable policy to determine whether given access operations by the hardware-application component HAC are allowed or not.

Figure 3:
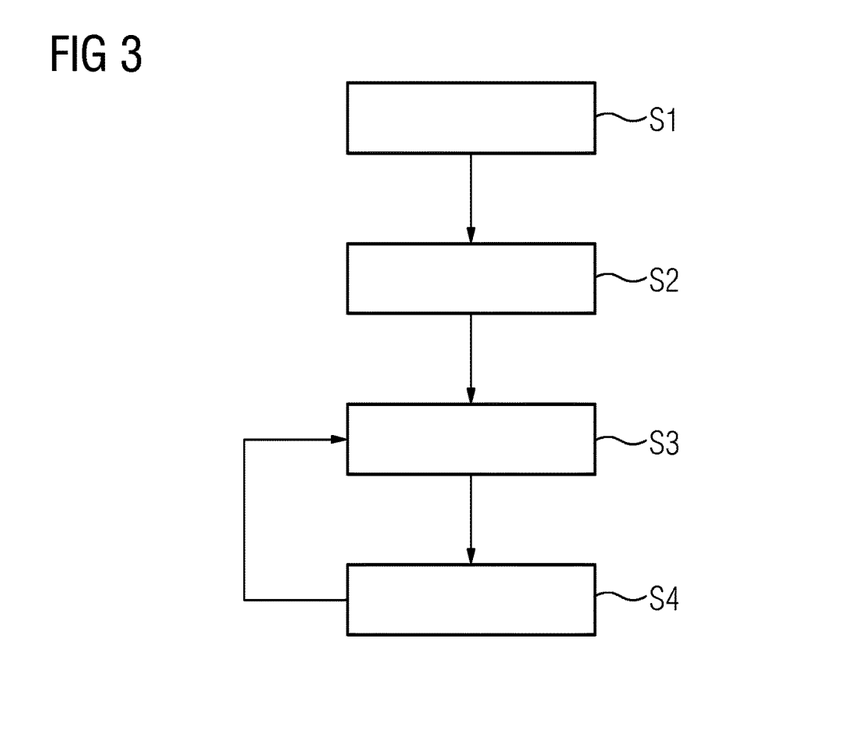
FIG. 3 shows a flowchart of a possible exemplary embodiment of a method for monitoring a hardware-application.

FIG. 3 shows a flowchart of a possible exemplary embodiment of a method for monitoring a hardware-application. The method comprises in the illustrated exemplary embodiment several main steps. In a receiving step S1, a hardware-application is received by a configurable hardware module, wherein the received hardware-application comprises configuration data describing an instantiation as a hardware-application component on the configurable hardware module.

In a further instantiating step S2, a trustworthy hardware component, in particular an on-chip logic located within the configurable hardware module, instantiates the received hardware-application as the hardware-application component in an execution environment, in particular a partial reconfiguration region, of the configurable hardware module.

In a following monitoring step S3, incoming and/or outgoing communication of the hardware-application component is monitored at runtime of the hardware-application component.

Finally, at least some of the incoming and/or outgoing communication of the hardware-application component is controlled at runtime of the hardware-application component in a controlling step S4.

Of course, the monitoring step S3 and the controlling step S4 can be implemented either alternatingly or simultaneously. In the latter case, the monitoring is part of the control.

The method can be executed by a processor such as a microcontroller or a microprocessor, by an Application Specific Integrated Circuit (ASIC), by any kind of computer, including mobile computing devices such as tablet computers, smartphones or laptops, or by one or more servers in a control room or cloud. For example, a processor, controller, or integrated circuit of the computer system and/or another processor may be configured to implement the acts described herein.

The above-described method may be implemented via a computer program product (non-transitory computer readable storage medium having instructions, which when executed by a processor, perform actions) including one or more computer-readable storage media having stored thereon instructions executable by one or more processors of a computing system. Execution of the instructions causes the computing system to perform operations corresponding with the acts of the method described above.

The instructions for implementing processes or methods described herein may be provided on non-transitory computer-readable storage media or memories, such as a cache, buffer, RAM, FLASH, removable media, hard drive, or other computer readable storage media. Computer readable storage media include various types of volatile and non-volatile storage media. The functions, acts, or tasks illustrated in the figures or described herein may be executed in response to one or more sets of instructions stored in or on computer readable storage media. The functions, acts or tasks may be independent of the particular type of instruction set, storage media, processor or processing strategy and may be performed by software, hardware, integrated circuits, firmware, micro code and the like, operating alone or in combination. Likewise, processing strategies may include multiprocessing, multitasking, parallel processing and the like.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for monitoring a hardware-application of an embedded device, the method comprising:
   receiving, by a configurable hardware module of the embedded device, a hardware-application, wherein the hardware-application comprises configuration data describing an instantiation as a hardware-application component on the configurable hardware module;
   instantiating, by an on-chip partial reconfiguration logic located within the configurable hardware module, the received hardware-application as the hardware-application component in an execution environment of the configurable hardware module, wherein the on-chip partial reconfiguration logic is configured to lock each execution environment to its assigned hardware-application; and
   monitoring incoming and/or outgoing communication of the hardware-application component at runtime of the hardware-application component,
   wherein the monitored communication is incoming from and/or outgoing to a kernel of an operating system being executed by a processor of the embedded device,
   wherein the kernel forms an interface between the hardware-application component and a user space with at least one software application,
   wherein the monitoring step is performed by a first unit and a second unit,
   wherein the first unit is a customized loadable kernel module that monitors and controls communication incoming from and outgoing to the kernel of the operating system being executed by the processor;
   wherein the second unit monitors and controls communication incoming from and/or outgoing to other hardware-application components, general-purpose inputs/outputs, computer ports, peripheral devices, IO controllers and/or on-chip logic;
   wherein the first unit and/or the second unit implement a fixed policy and a reconfigurable policy for the controlling of the incoming and/or outgoing communication of the hardware-application component.

2. The method according to claim 1, wherein the monitored communication is incoming from and/or outgoing to:
   the at least one software application of the embedded device being executed by the processor;
   another hardware-application component of the embedded device;
   a general-purpose input/output of the embedded device;
   a computer port of the embedded device;
   a peripheral device of the embedded device; and/or
   the on-chip logic located within the configurable hardware module.

3. The method according to claim 1,
   with the additional step of controlling at least some of the incoming and/or outgoing communication of the hardware-application component at runtime of the hardware-application component by blocking and/or modifying at least some of the incoming and/or outgoing communication of the hardware-application component.

4. The method according to claim 3,
   wherein the monitoring step includes detecting an unauthorized access to and/or from the hardware-application component; and
   wherein the controlling step includes:
   blocking the unauthorized access;
   disabling access to at least one functionality of the hardware-application component and/or the configurable hardware module;
   blocking all communication of the hardware-application component;
   logging the unauthorized access;
   replacing the hardware-application component with a secure hardware-application component; and/or
   terminating the hardware-application component.

5. The method according to claim 1,
   wherein the second unit monitors and controls communication incoming from and/or outgoing to
   at least one other hardware-application component;
   at least one general-purpose input/output;
   at least one computer port;
   at least one peripheral device; and/or
   at least one on-chip logic.

6. The method according to claim 1, wherein the second unit is instantiated in the instantiating step as a wrapper around the hardware-application within the execution environment;
   a switching module that gates all inputs and outputs of the hardware-application component; or
   a controller.

7. The method according to claim 1,
   wherein reconfigurable policy of the first unit and/or the second unit is updated at runtime of the configurable hardware module.

8. A non-transitory computer-readable storage media comprising stored thereon:
   a hardware/software application package, comprising configuration information required for automated performing of the method according to claim 1,
   wherein the configuration information includes at least one hardware-application that can be instantiated as a hardware-application component and executed by an execution environment; and
   wherein the configuration information includes a fixed policy and/or a reconfigurable policy for automated monitoring and/or controlling of incoming and/or outgoing communication of the hardware-application component.

9. The computer-readable storage media according to claim 8,
   wherein the hardware/software application package also contains a software application and a signature, and wherein the software application contains instructions executable by a processor.

10. A configurable hardware module for monitoring a hardware-application for an embedded device, comprising:
    at least one execution environment configurable for execution of a hardware-application component;

a trustworthy hardware component configured for instantiation of a hardware-application as the hardware-application component within the at least one execution environment; and a first unit and a second unit, configured for monitoring incoming and/or outgoing communication of the hardware-application component at runtime of the hardware-application component, wherein the first unit is a kernel module that monitors and controls communication incoming from and/or outgoing to a kernel of an operating system being executed by a processor of the embedded device having the monitored hardware-application, wherein the kernel forms an interface between the hardware-application component and a user space with at least one software application, wherein the monitoring step is performed by a first unit and a second unit, wherein the first unit is a customized loadable kernel module that monitors and controls communication incoming from and outgoing to the kernel of the operating system being executed by the processor;

wherein the second unit monitors and controls communication incoming from and/or outgoing to other hardware-application components, general-purpose inputs/outputs, computer ports, peripheral devices, IO controllers and/or on-chip logic;

wherein the first unit and/or the second unit implement a fixed policy and a reconfigurable policy for the controlling of the incoming and/or outgoing communication of the hardware-application component.

11. The configurable hardware module according to claim 10, comprising a field programmable gate array, an application specific integrated circuit, or an application specific standard product.

12. The configurable hardware module according to claim 10, wherein the configurable hardware module is a field-programmable gate array or contains a field-programmable gate array;

the execution environment is a partial reconfiguration region; and/or the trustworthy hardware component is an on-chip logic, in particular a PR logic.

13. The configurable hardware module according to claim 10, comprising a hardware bus that is used by the hardware-application component for the incoming and/or outgoing communication; and wherein the first unit and/or the second unit are configured for monitoring communication that is incoming from and/or outgoing to at least one device or component connected to the hardware bus.

14. The configurable hardware module according to claim 13, wherein the hardware bus is chosen from a group of hardware-buses comprising at least an advanced microcontroller bus architecture, an advanced high-performance bus, an advanced extensible bus, a wishbone bus and/or a peripheral component interconnect express bus.

15. The configurable hardware module according to claim 10, wherein the second unit is a wrapper around the hardware-application within the execution environment;

a switching module that gates all inputs and outputs of the hardware-application component; or a controller.

16. The configurable hardware module according to claim 10, configured for executing a method for monitoring the hardware-application.

17. An embedded device, comprising the configurable hardware module according to claim 10.

* * * * *